Patented July 22, 1941

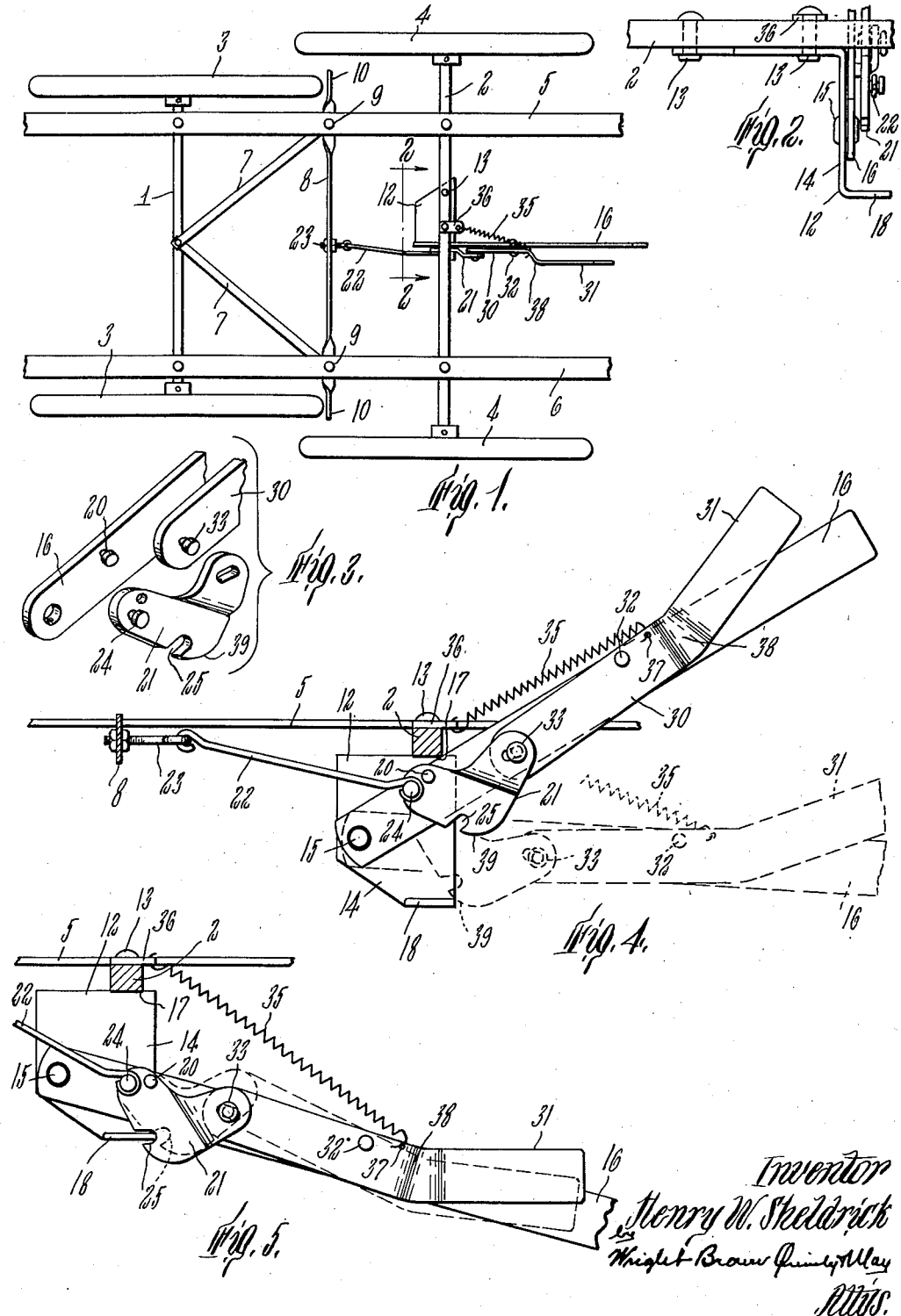

2,249,860

UNITED STATES PATENT OFFICE 2,249,860

VEHICLE BRAKE

Henry W. Sheldrick, Gardner, Mass., assignor to Collier-Keyworth Company, Gardner, Mass., a corporation of Massachusetts Application March 14, 1941, Serial No. 383,382

8 Claims. (Cl. 188—20)

This invention relates to vehicle brakes of a type particularly suitable for baby carriages. Such brakes are commonly arranged to be set downward pressure exerted by the foot of the operator on a lever projecting rearwardly from the running gear, and to be released by applying foot pressure to a release lever. Depression of the release lever in brakes as heretofore constructed has permitted the brake applying lever to snap quickly to released position resulting in considerable noise, and it has not been convenient for the operator to control the release motion of the brake lever to avoid this. This noise is likely to disturb the child in the baby carriage, particularly should he be asleep when this release action takes place.

An object of the present invention, therefore, is to provide a brake mechanism wherein the release mechanism is so related to the brake applying mechanism that the release is under full control of the operator, and the return of the applying means to full released position may be made as gradually as desired and without requiring any particular attention or special effort by the operator.

To this end the release mechanism is carried directly by the applying mechanism and when in released position becomes essentially a portion of the applying mechanism during the return motion of the applying mechanism to fully released position.

For a more complete understanding of this invention, reference may be had to the accompanying drawing in which Figure 1 is a fragmentary top plan of the running gear of a baby carriage showing a brake embodying this invention.

Figure 2 is a detail section to a larger scale on line 2—2 of Figure 1.

Figure 3 is a fragmentary exploded perspective of certain closely related parts of the brake mechanism.

Figure 4 is a fragmentary side elevation of the brake applying and releasing mechanism, the full lines showing the parts in brake released position and the dotted lines showing the parts lowered nearly to applied and locked position.

Figure 5 is a view similar to Figure 4, but with the brake fully applied, the dotted lines showing the release mechanism in releasing position, but with the brake not released.

Referring to the drawing, at 1 and 2 are indicated front and rear axles, respectively, to the end portions of which are journaled the front and rear wheels 3 and 4, respectively. These axles are held in spaced parallel relation by suitable frame members such as the side springs 5 and 6 and the intermediate portion of the front axle 1 is connected to these springs by means of the inclined braces 7. The brake, as shown here, is intended to be active against the peripheries of the forward wheels 3 and as shown is a well known form of brake consisting of a flexible brake bar 8 fulcrumed at 9 to the springs 5 and 6 and having end portions 10 formed as shoes which can be pressed against the peripheries of the wheels 3 by flexing the intermediate portion of the bar 8 between the pivots 9 rearwardly. The resiliency of the bar 8 tends to release the brakes when pressure exerted on the intermediate portion of the bar 8 is released.

The brake controlling means comprises a bracket plate 12 of Z shape which is secured through a horizontal top portion to the lower face of the axle 2 as by means of rivets 13. To its vertical intermediate wall member 14 it has pivoted thereto at 15 the forward end of the brake applying lever 16, which in the full released position of the brake, shown in full lines in Figure 4, may impinge against the lower rear edge 17 of the rear axle 2. A lower horizontal portion 18 of this bracket forms a latch engaging element as will later appear. To one side face of the brake applying lever 16 there is pivoted at 20 a latch element 21 and this element 21 is connected through a link 22 to an eye bolt 23 secured to the intermediate portion of the brake bar 8. The rear end of this link 22 is pivoted to a pin 24 carried by the latch 21. This latch 21 is provided with a notch 25 which, in the fully set position of the brake shown in full lines in Figure 5, engages about the fixed latch element 18 of the bracket 12 and holds the intermediate portion of the brake bar 8 flexed rearwardly with its shoe portions 10 pressed against the peripheries of the wheels 3. In this position of the brake lever 16, also, its outer end extends substantially to the ground, thus acting as an anti-tip device, preventing upsetting of the carriage when it is standing. The latch 21 is connected to a brake release lever 30, the rear end portion of which is upwardly inclined as at 31. This release lever is fulcrumed at 32 on the lever 16 and its forward end is connected through a pin and slot connection at 33 with the latch 21. A coil spring 35 is engaged at one end to a lug 36 secured to the top face of the rear axle 1 as by one of the rivets 13 and the rear end of this spring 35 is engaged in a hole 37 through the release lever 31 somewhat back of the fulcrum 32 of this lever.

The rear portion of the release lever is laterally offset, as shown at 38 in Figure 1, from the plane of the lever 16, so that it is convenient for the operator to selectively engage either, to set the brake by depressing the brake applying lever 16 with the foot and to release the brake and control the return motion of the applying lever 16 by foot pressure exerted on the rear end of the release lever 31.

When it is desired to apply the brake, the pressure is exerted downwardly on the rear end portion of the lever 16 to swing it from the position shown in Figure 4 to the position shown in Figure 5. When the intermediate dotted line position of Figure 4 is reached, it will be noted that a curved cam face 39 of the latch 21 engages on the rearward edge of the stationary latch plate 18. Further downward motion of the lever 16 causes this latch plate engaging the cam face of the latch to rock the latch backwardly until its notch 25 comes opposite to the portion 18, whereupon the spring 35, as well as the pressure exerted by the resiliency of the brake bar 8, causes the latch to snap into the full line position of Figure 5 with the latch plate 18 engaging in the notch 25. The brake is now fully applied and locked in applied position. The brake lever 16 acts with the latch 21 and the link 22 as a toggle mechanism which is almost in its "made" position when the brake is fully applied.

To release the brake, the operator depresses the rear end of the release lever 31. The first result of this action is to tilt the release lever from the full to the dotted line position of Figure 5, and to retract the latch 21 from latching position, but it will be noted that this downward pressure on the release lever also acts in the same direction through the fulcrum 32 to hold the brake applying lever 16 depressed. When the release lever is in the dotted line position of Figure 5, the pin and slot connection at 33 has reached one limit of its motion so that the release lever and the latch are rigidly connected to each other and form substantially a portion of the applying lever 16. If now the operator gradually removes pressure of the foot from the latch lever 31, the spring 35 returns the applying lever 16 to full released position under the full control of the operator who by pressure exerted on the release lever retains the release lever and the latch in the dotted line relationship of Figure 5. Removal of the foot from the release lever then permits the release lever to be pulled further upwardly, rocking the latch 21 back to the full line position shown in Figure 4 in which position the pin and slot connection 33 is at its other limit of motion so that the spring 35 is effective through the release lever 31 and the latch and the fulcrum 32 to retain the applying lever 16 in its full released position. It will thus be seen that by exerting a gradually decreased pressure on the latch release lever, the applying lever is returned from brake applied to fully released position under the full control of the operator so that as long as the foot is held on the release lever, there is no chance for the applying lever to snap back to released position and be noisy.

From the foregoing description of an embodiment of this invention, it should be evident to those skilled in the art that various changes and modifications might be made without departing from the spirit or scope of this invention.

I claim:

1. In a vehicle brake, brake applying means comprising a lever and operative connections including a toggle from said lever causing motion of said lever in one direction to a predetermined angular position to make said toggle and apply the brake and in the opposite direction from said position to break said toggle and release said brake, latch means for holding said lever in said brake applying position, and means for releasing said brake comprising a release lever carried by said brake applying lever and connections from said release lever to said latch.

2. In a vehicle brake, brake applying means comprising a lever, latch means for holding said lever in brake applying position, means for releasing said brake comprising a release lever carried by said brake applying lever and connections from said release lever to said latch, brake actuating connections to said latch, and a spring connecting said release lever to a fixed point tending to hold said release lever in latched position and said applying lever out of said brake applying position.

3. In a vehicle having axles and frame members holding said axles in spaced relation, a brake bar pivoted to said frame members and having shoe portions for braking engagement with wheels on one of said axles by flexing an intermediate portion of said bar to turn the end portions thereof about said pivots, a bracket secured to the other of said axles, a brake applying lever pivoted near one end to said bracket, a latch pivoted to said lever and having a notch, said bracket having a portion for latching engagement in said notch when said applying lever is in brake applying angular position, a link connecting said latch adjacent to its pivot to said intermediate portion of said brake bar, a brake release lever fulcrumed on said applying lever and connected to said latch for moving said latch to releasing angular position on rocking of said release lever in one direction from latch engaging position, and means for limiting the rocking of said release lever in release direction relative to said applying lever whereupon said release and applying lever are movable as a unit in brake releasing direction while said release lever is in latch releasing position.

4. In a vehicle having axles and frame members holding said axles in spaced relation, a brake bar pivoted to said frame members and having shoe portions for braking engagement with wheels on one of said axles by flexing an intermediate portion of said bar to turn the end portions thereof about said pivots, a bracket secured to the other of said axles, a brake applying lever pivoted near one end to said bracket, a latch pivoted to said lever and having a notch, said bracket having a portion for latching engagement in said notch when said applying lever is in brake applying angular position, a link connecting said latch adjacent to its pivot to said intermediate portion of said brake bar, a brake release lever fulcrumed on said applying lever and connected to said latch for moving said latch to releasing angular position on rocking of said release lever in one direction from latch engaging position, means for limiting the rocking of said release lever in release direction relative to said applying lever whereupon said release and applying lever are movable as a unit in brake releasing direction while said release lever is in latch releasing position, and a spring connecting said release lever and bracket in position to tend to hold said release lever in latching angular position and said applying lever in brake release angular position.

5. In a vehicle having axles and frame members holding said axles in spaced relation, a brake bar pivoted to said frame members and having shoe portions for braking engagement with wheels on one of said axles by flexing an intermediate portion of said bar to turn the end portions thereof about said pivots, a bracket secured to the other of said axles, a brake applying lever pivoted near one end to said bracket, a latch pivoted to said lever and having a notch, said bracket having a portion for latching engagement in said notch when said applying lever is in brake applying angular position, a link connecting said latch adjacent to its pivot to said intermediate portion of said brake bar, a brake release lever fulcrumed on said applying lever and connected to said latch for moving said latch to releasing angular position on rocking of said release lever in one direction from latch engaging position, means for limiting the rocking of said release lever in release direction relative to said applying lever whereupon said release and applying lever are movable as a unit in brake releasing direction while said release lever is in latch releasing position, and a spring connecting said release lever and bracket in position to tend to hold said release lever in latching angular position and said applying lever in brake release angular position, said levers having their outer ends laterally spaced and selectively accessible to the foot of a person operating the vehicle.

6. In a vehicle having axles and frame members holding said axles in spaced relation, a brake bar pivoted to said frame members and having shoe portions for braking engagement with wheels on one of said axles by flexing an intermediate portion of said bar to turn the end portions thereof about said pivots, a bracket secured to the other of said axles, a brake applying lever pivoted near one end to said bracket, a latch pivoted to said lever and having a notch and a cam portion adjacent to said notch for engagement with said bracket when said applying lever is depressed rocking said latch until said notch is in position to snap into latching relation to said bracket whereupon said applying lever is latched in brake applying angular position, a link connecting said latch adjacent to its pivot to said intermediate portion of said brake bar, a brake release lever fulcrumed on said applying lever and connected to said latch for moving said latch to releasing angular position on rocking of said release lever in one direction from latch engaging position, and means for limiting the rocking of said release lever in release direction relative to said applying lever whereupon said release and applying lever are movable as a unit in brake releasing direction while said release lever is in latch releasing position.

7. In a vehicle having a running gear comprising frame members, axles carried by said frame members, and wheels carried by said axles, brake mechanism carried by said running gear including a wheel brake, a lever fulcrumed on said running gear for up and down motion, operative connections from said lever to said brake for applying and releasing said brake by swinging of said lever, said lever extending downwardly near to the ground when in brake applying position and acting as an anti-tip device for the vehicle, latch means for holding said lever in brake applied position, a latch releasing lever fulcrumed on said brake applying lever and connected to said latch to hold said latch released when one end of said releasing lever is depressed relative to said brake applying lever, and means limiting the pivotal motion of said release lever with respect to said applying lever, said brake mechanism including means tending to hold said brake lever released and said latch in latched position when the brake is applied.

8. In a vehicle brake mechanism, brake applying means comprising a lever fulcrumed for up and down motion, and connections from said lever causing brake application when one end of said lever is depressed into position close to the ground in which position it acts as a vehicle anti-tip device and causing brake release when said end is lifted, a latch for holding said lever in brake applied and vehicle anti-tip position, a latch releasing lever fulcrumed on said brake applying lever between the fulcrum of said brake applying lever and said end for up and down motion and connected to said latch and with one end depressed relative to said brake applying lever when said latch is in released position, said mechanism including means tending to hold said brake applying lever released and said latch in latched position when said brake applying lever is in brake applying position, and means limiting the pivotal motion of said release lever with respect to said brake applying lever.

HENRY W. SHELDRICK.